United States Patent
Hoppe et al.

(10) Patent No.: US 12,441,359 B2
(45) Date of Patent: Oct. 14, 2025

(54) METHOD FOR OPERATING A TRANSPORTATION VEHICLE AND A TRANSPORTATION VEHICLE

(71) Applicant: VOLKSWAGEN AKTIENGESELLSCHAFT, Wolfsburg (DE)

(72) Inventors: Jannis Hoppe, Braunschweig (DE); Daniel Münning, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 167 days.

(21) Appl. No.: 18/349,296

(22) Filed: Jul. 10, 2023

(65) Prior Publication Data
US 2024/0010228 A1    Jan. 11, 2024

(30) Foreign Application Priority Data
Jul. 8, 2022  (DE) ................ 10 2022 207 005.4

(51) Int. Cl.
*B60W 60/00*    (2020.01)
*B60W 40/06*    (2012.01)
*G06V 20/56*    (2022.01)

(52) U.S. Cl.
CPC .......... *B60W 60/001* (2020.02); *B60W 40/06* (2013.01); *G06V 20/588* (2022.01); *B60W 2420/403* (2013.01); *B60W 2552/20* (2020.02); *B60W 2555/20* (2020.02)

(58) Field of Classification Search
CPC .... B60W 60/001; B60W 40/06; G06V 20/588
See application file for complete search history.

(56) References Cited

U.S. PATENT DOCUMENTS

| | | | |
|---|---|---|---|
| 11,325,594 B2 | 5/2022 | Jiang et al. | |
| 2017/0025017 A1* | 1/2017 | Thomas | ................ B60W 10/20 |
| 2022/0204048 A1 | 6/2022 | Klomp et al. | |

(Continued)

FOREIGN PATENT DOCUMENTS

| | | |
|---|---|---|
| DE | 102013019112 A1 | 5/2015 |
| DE | 102019213185 A1 | 3/2021 |
| DE | 102019217429 A1 | 5/2021 |

(Continued)

*Primary Examiner* — Imran K Mustafa
(74) *Attorney, Agent, or Firm* — BARNES & THORNBURG LLP

(57) ABSTRACT

A method for operating a transportation vehicle wherein an image capturing unit is used to generate an optical image of an upcoming roadway lying ahead in the direction of travel of the transportation vehicle. The image is used to ascertain an ego lane of the roadway assigned to the transportation vehicle and an upcoming profile of the ego lane. At least one item of meta information that influences the detection of the ego lane and/or of the upcoming profile of the ego lane is captured. Swarm data pertaining to the roadway are retrieved from a database, a comparison lane of the roadway and a comparison profile of the comparison lane are derived from the swarm data, and the at least one item of meta information, the upcoming profile and the comparison profile are used to ascertain an uncertainty factor for the image from the image capturing unit.

23 Claims, 2 Drawing Sheets

(56) References Cited

U.S. PATENT DOCUMENTS

2022/0212663 A1 7/2022 Münning et al.
2022/0332316 A1 10/2022 Münning et al.

FOREIGN PATENT DOCUMENTS

| DE | 102020202163 | A1 | 8/2021 |
| DE | 102021101031 | A1 | 8/2021 |
| DE | 102021200023 | A1 | 7/2022 |
| WO | 2020225065 | A1 | 11/2020 |
| WO | 2021069555 | A1 | 4/2021 |

\* cited by examiner

METHOD FOR OPERATING A TRANSPORTATION VEHICLE AND A TRANSPORTATION VEHICLE

PRIORITY CLAIM

This patent application claims priority to German Patent Application No. 10 2022 207 005.4, filed 8 Jul. 2022, the disclosure of which is incorporated herein by reference in its entirety.

SUMMARY

Illustrative embodiments relate to a method for operating a transportation vehicle. Moreover, the illustrative embodiments relate to a transportation vehicle, in particular, a transportation vehicle that performs the disclosed method, optionally, automatically.

BRIEF DESCRIPTION OF THE DRAWINGS

Disclosed embodiments are explained in more detail below on the basis of the drawings. In the drawings.

DETAILED DESCRIPTION

Figure 1:
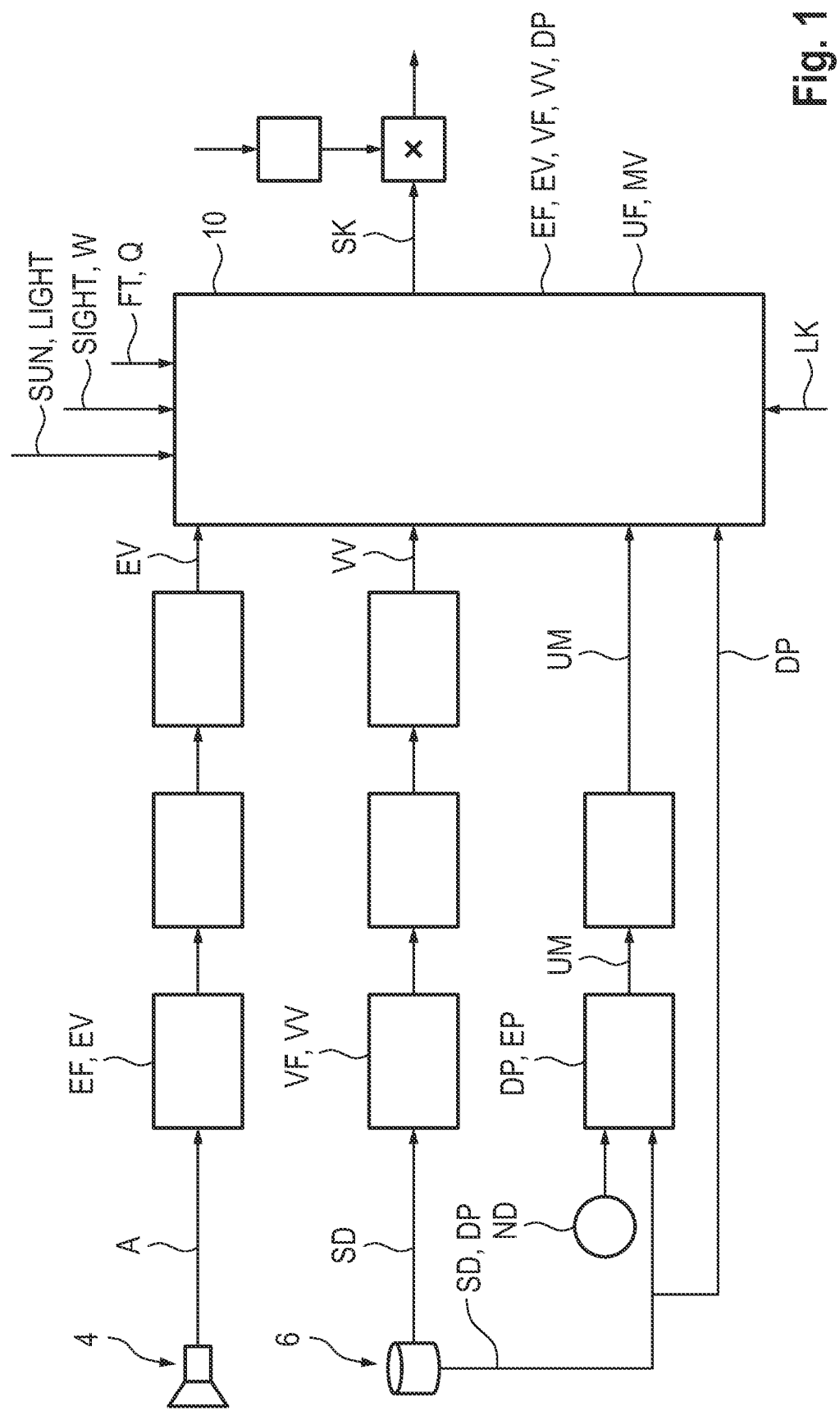
FIG. 1 shows a schematic block diagram of a disclosed method for operating a transportation vehicle.

Modern (land-based and, in particular, wheeled) transportation vehicles are increasingly equipped with automated driver assistance functions that progressively relieve the driver of tasks. At first, these were mostly specialized functions, such as vehicle longitudinal guidance in the context of speed control with distance control or a parking assistant that can also carry out vehicle lateral guidance. Advanced functions, in particular, in the context of "automation level 2", are also intermittently automated functions of vehicle longitudinal and lateral guidance in which, for example, lane changes on a highway can be carried out automatically. However, a maximum permissible lateral acceleration for an assisted lane change is at present strictly regulated by law. For example, a lane change may thus currently add no more than 1 m/s$^2$ to a current lateral acceleration—which is limited to 3 m/s$^2$ but may be exceeded briefly by a maximum of 10 percent.

The basis for complying with these regulations is therefore, among other things, knowledge of the upcoming road profile that is as precise as possible. In principle, it may seem obvious here that a camera directed forward in the direction of travel can capture the road, specifically the roadway, and that the profile of the roadway and the lane used on the roadway should therefore be known. For the profile to be "capturable" (i.e., also processable) by a computer program—an aforementioned assistance function is regularly formed on a processor by such a computer program—the profile initially has to be detected in the optical images. To this end, use is usually made of pattern recognition methods and the like. The problem in this case is that, depending on lighting conditions, for example, the angle of incidence of sunlight, darkness, low visibility due to fog, poorly detectable roadway markings, damaged roadway edges and the like, it may in part not be possible to estimate the profile of the roadway precisely enough. If, for example, a roadway lane curvature that is too small, i.e., a curve radius that is too narrow, is recorded in this case, the lane change is deemed to be impermissible on account of the current and/or expected lateral acceleration and is possibly aborted, and control is optionally handed over to the driver, even though this might not be necessary at all. Such vehicle behavior is known to have a negative effect on customer acceptance, in particular, therefore, on trust in the assistance function.

Disclosed embodiments allow improved operation of such a driver assistance function.

This is achieved by a disclosed method for operating a transportation vehicle and by a transportation vehicle.

The disclosed method is used to operate a (in particular, land-based, wheeled) transportation vehicle. The method involves an image capturing unit being used to generate an optical image (for example, a still image but optionally a moving image, which may be a continuous capture of still images at a predefined frame rate) of an upcoming roadway lying ahead in the direction of travel of the transportation vehicle. This image is used as a basis for ascertaining an ego lane of the roadway assigned to the transportation vehicle. The image is also used as a basis for ascertaining an upcoming (in particular, spatial) profile of the ego lane (i.e., a type of curve of the ego lane). Moreover, at least one item of meta information that influences or at least may influence the detection of the ego lane and/or of the upcoming profile of the ego lane is captured. Furthermore, swarm data pertaining to the roadway (in particular, the roadway currently being driven on) are retrieved from a database and a comparison lane of the roadway and a comparison profile of the comparison lane are derived from these swarm data. The at least one item of meta information, the upcoming profile and the comparison profile are subsequently used as a basis for ascertaining an uncertainty factor for the image from the image capturing unit, in particular, for the ego lane derived therefrom and the profile thereof. In other words, the present information is used as a basis for ascertaining how reliable the image may be, in particular, how reliable the detection of the ego lane and the profile thereof from the image may be. This uncertainty factor is used as a basis for determining weighting factors for the (derived) upcoming profile and for the comparison profile. Once these weighting factors have been applied, a mixed profile of the ego lane is then generated ("mixed") and this mixed profile is provided for a vehicle guidance function of the transportation vehicle for the guidance thereof on the roadway (i.e., thus for a driver assistance function).

In this case, the mixed profile can, for example, be—on the basis of the weighting factors—a true mixed profile, which contains portions of the derived profile of the ego lane and portions of the comparison profile, or, if the uncertainty factor is sufficiently low, only the profile of the ego lane and, accordingly conversely, if the uncertainty factor is sufficiently high, only the comparison profile.

"Roadway" is understood here and below to mean the entire road, which may be uniform in structure. The "lane" is an area which is demarcated widthwise for a transportation vehicle on the roadway. Usually, the roadway also contains lanes leading in the oncoming direction of travel. In the case of structurally separated directions of travel, the roadway may, however, also contain only lanes leading in one direction of travel.

The operations described above, such as, e.g., ascertaining the roadway and the ego lane, etc., may be performed with the aid of a control unit (also: "controller"), specifically by such a controller, more precisely a processor of the controller.

"Vehicle guidance function", "vehicle lateral guidance" and the like are understood here and below to mean not only the execution and transmission of control commands (that is to say steering measures, acceleration, braking and the like) but the (entire) functionality (in particular, when executing a corresponding program on the controller) comprising, in addition to the delivery and execution of control commands, also the processing of background data (for example, the mixed profile), to also be able to generate the control commands in a manner that is as precise as possible and that is permissible by law.

To be processed by the controller, the roadway and also the ego lane (and also the comparison lane) are defined by lateral (in particular, virtual) boundaries, which, for example, are ascertained on the basis of a roadway marking and/or roadway surface boundary or the like detected in the image.

According to the exemplary embodiments, the current situation, specifically the quality of the ascertainment of the profile of the ego lane from the currently captured image, is thus assessed and different information pertaining to the upcoming roadway is used according to this quality. If a sufficiently high quality of ascertainment of the profile of the ego lane is assumed, this profile can be used (at least almost) without alteration for the vehicle guidance. If a reduced quality is assumed, the swarm data are used in a supporting capacity or else (in the case of particularly low quality) exclusively. It can be assumed from this—on account of a likely high number of data sources for the swarm data—that individual errors have statistically less relevance and effect and the swarm data therefore have a comparatively high reliability. The disclosed embodiment, therefore, provides an option of making available comparatively reliable data for the vehicle guidance, with the result that a decision-making basis for the (in particular, automated) vehicle guidance can be improved.

In an exemplary method, a driving line (also referred to as a so-called "drivable path") for the comparison lane is derived from the swarm data. This drivable path may correspond to that line in the lane which the other transportation vehicles generating the swarm data have "followed", that is to say have "taken". Furthermore, an ego position of the transportation vehicle on the roadway, optionally within the ego lane, optionally in relation to at least one lateral boundary of the ego lane (for example, one of the aforementioned detected boundaries such as, e.g., a roadway marking), is ascertained and compared with the drivable path. In other words, the transportation vehicle's (also: ego vehicle's) own position (ego position) in the lane (ego lane) being used is determined and compared with the drivable path. As described above, for statistical reasons it can be assumed that the drivable path reproduces a curve that can be taken on the roadway or lane relatively well, at least with only a small effect of errors (driving errors and also errors as a result of error detections in automated driving functions) of individual transportation vehicles. By comparing the ego position with the drivable path, information can therefore be derived about whether the ego position (sufficiently) matches the drivable path. For example, it is possible to derive therefrom whether the detection of the ego lane has been carried out precisely enough.

In a development, a degree of match between the ego position and the drivable path is ascertained (in particular, on the basis of the comparison). For example, in this case it is a question of a local difference between the ego position and a corresponding "waypoint" of the drivable path, which, for example, is determined in absolute terms (for example, on the basis of satellite navigation data) or in relative terms in relation to a boundary of the (ego) lane. The degree of match is then used—in particular, in addition—to determine the uncertainty factor and/or to determine the weighting factors. For example, in the case of a high degree of match between the ego position and the drivable path, an approximately 50:50 weighting of the ego lane and the comparison lane can be set since it can be assumed that the positioning of the transportation vehicle on the roadway and therefore also the detection of the ego lane is currently comparatively correct. In the case of a particularly high degree of match, a greater weighting in favor of the ego lane (for example, 60:40, 80:20, 90:10 or the like) can in principle also take place.

It is also beneficial if a previous trend in the ego position over time is used for comparing the ego position with the driving line. In particular, in this case the drivable path can thus be compared with a "driven path" derived from the image (for example, over the last 5 seconds). This can provide a greater significance about the relative positioning of the transportation vehicle on the roadway than a solely pointwise comparison.

In an exemplary method, the uncertainty factor is also used as a basis for determining a weighting factor for the drivable path. In this case, the drivable path weighted on the basis of the weighting factor is also used for generating the mixed profile. For example, in the case of a particularly high degree of match between the ego position and the drivable path (possibly irrespective of the accuracy of the detection of the ego lane), for example, in the case of a deviation of below 10% or of less than half a meter), a weighting factor for the drivable path can be chosen in such a way that, for generating the mixed profile, the drivable path is used alone (i.e., to 100%), also only mixed with the profile of the ego lane (for example, as a 50:50 weighting with the ego lane), or—in particular, in the case of a lower degree of match—also with the "ego profile" and the comparison profile.

In a further exemplary method, the at least one item of meta information captured is a current variable environmental situation and/or an approximately invariable property of the surroundings. Optionally, both the environmental situation and the property of the surroundings are each captured as an item of meta information and used for determining the uncertainty factor.

Optionally, the current environmental situation ascertained is the position of the sun (in particular, as an angle of incidence of the sunlight), a lighting type (e.g., daylight or night, i.e., darkness; changing lighting on account of "patchy" clouds or local streetlight light at night; brightness but no direct solar radiation on account of a complete cloud layer, etc.), visibility (for example, fog) and/or the weather (in particular, rain, snow). For example, a low position of the sun with the light in one's eyes can make it more difficult to detect roadway markings, for example, also strengthened by a rain-slicked roadway after rainfall, or snow can temporarily cover roadway markings and road surface boundaries.

The approximately invariable property of the surroundings ascertained is, for example, a roadway type (asphalt, concrete, gravel, one-lane, two-lane, with or without a center marking, with a lateral marking, with a sidewalk and the like), a marking quality of a roadway marking and/or a quality of the roadway surface at the transition to a shoulder.

To ascertain the at least one item of meta information, use is optionally made of additional sensors, e.g., rain sensors, brightness sensors and the like. Additionally or alternatively, the at least one item of meta information is ascertained on the basis of the image from the image capturing unit (in particular, with regard to the invariable properties of the surroundings).

The uncertainty factor and/or the weighting factors can also optionally be specified depending on the time of day. For example, a drop below a specified uncertainty value can be precluded at night, for example, to prevent the mixed profile from being generated exclusively from the ego profile at night. The same applies for the position of the sun such that in the case of a low position of the sun and associated light in one's eyes the uncertainty factor for a correct detection of the ego lane is calculated to be comparatively high (such that the mixed profile cannot in turn be generated from the ego profile alone).

Optionally, the comparison lane of the roadway and the comparison profile thereof are ascertained by averaging (in particular, from the obtained swarm data).

Furthermore, the ego lane, the upcoming profile thereof, the comparison lane, the comparison profile thereof and/or the drivable path can optionally also be filtered, in particular, smoothed, before determining the uncertainty factor.

Moreover, a localization confidence of the swarm data can also expediently be taken into account when determining the uncertainty factor. This indicates the degree of certainty to which the ego vehicle is correctly positioned "over" (i.e., correctly in relation to) the swarm data. The localization confidence may be ascertained "online", i.e., in particular, on board the transportation vehicle, optionally by the aforementioned controller. If the localization confidence has a small value (that is to say the certainty that the ego vehicle is "correctly" positioned in relation to the swarm data is low), a comparatively low weighting factor is assigned to the swarm data (that is to say to the comparison lane and to the comparison profile, optionally also to the drivable path), and optionally accordingly the opposite in the case of a high value of the localization confidence.

In an exemplary method, the mixed profile of the ego lane can be used as a basis for ascertaining a (in particular, spatial) lane curvature of the profile of the ego lane. This lane curvature can then be used (for example, in the context of or for vehicle lateral guidance), which is in turn used for assessing permissibility of a lane change. In particular, if the drivable path and optionally also the degree of match in relation to the ego position are ascertained, the lane curvature can be ascertained particularly precisely from the drivable path in the case of a high degree of match between the ego position and the drivable path (in other words: if the ego vehicle follows the drivable path relatively exactly) and the lateral acceleration can therefore also be estimated particularly precisely. In the latter case, it can thus be beneficial to assign a high weighting factor to the drivable path in the case of a high degree of match with the ego position.

The disclosed transportation vehicle has the above-described image capturing unit (in particular, a digital camera), a communication unit (for example, a data interface) for communicating with the database and the aforementioned control unit (controller). The control unit is linked to the image capturing unit and the communication unit for signal transmission purposes and is configured to carry out the above-described method, optionally, automatically.

The transportation vehicle therefore has—at least when the control unit is performing the above-described method—the same features and resulting benefits as the above-described method.

Thus, as described above, in particular, as a result of a type of plausibility check being performed at least on the data captured and derived by the image capturing unit (that is to say the images and the ego lane extracted therefrom, etc.) and possibly being mixed with swarm data or—in the case of poor quality of the individual data—the swarm data even being used alone, the accuracy during the ascertainment of the upcoming profile of the ego lane can be improved. In particular, lane changes intended by an automated vehicle guidance function can be better checked for their reliability (e.g., on account of a check as to whether, at the current speed of the transportation vehicle, the upcoming lane curvature of the ego lane would lead to a lateral acceleration that lies outside of a permissible range, if a lane change were to take place in addition to the lane curvature) such that the risk of the automated vehicle guidance being aborted can be reduced.

Within the scope of the disclosure, the controller (or the control unit) can be a non-programmable electronic circuit and can be formed here, for example, by an "on-board computer" of the transportation vehicle. Within the scope of the disclosure, the controller can, however, also be formed by a microcontroller in which the functionality to carry out the disclosed method is implemented as a software module.

The conjunction "and/or" is to be understood here and below to mean that the features linked using this conjunction can be a combination and also alternatives to one another.

Parts that correspond to one another are always provided with the same reference signs in all figures.

Figure 2:
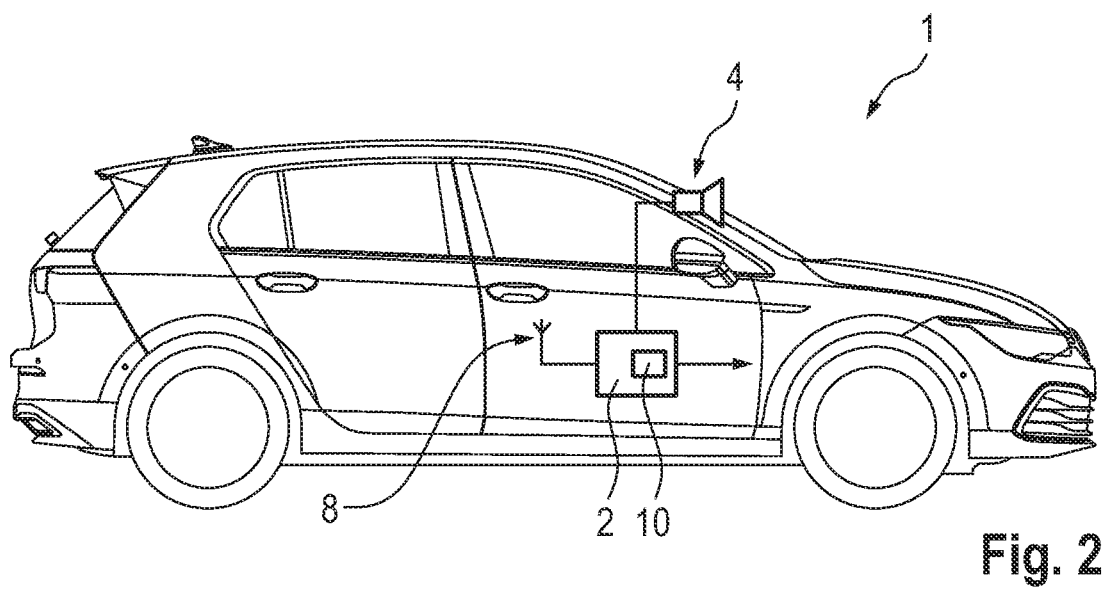
FIG. 2 shows a schematic side view of the transportation vehicle configured to perform the disclosed method.

FIG. 1 schematically shows a method which, during intended operation of a transportation vehicle 1 shown in more detail in FIG. 2, is carried out automatically by a control unit 2 (also: controller) of the transportation vehicle 1. In this case, the method is used to operate the transportation vehicle 1.

The method involves an image capturing unit, here a camera 4 pointed in the direction of travel, being used in this case to generate an optical image A of an upcoming roadway lying ahead in the direction of travel of the transportation vehicle 1, and supply this image to the control unit 2. This image A is used as a basis for ascertaining an ego lane EF of the roadway assigned to the transportation vehicle 1. In the case of a multi-lane roadway, the lane that the transportation vehicle 1 is currently using is chosen as the ego lane. The image A is also used as a basis for ascertaining an upcoming (in particular, spatial) profile EV of the ego lane (i.e., a type of curve of the ego lane EF).

To detect the profile EV, the control unit 2 carries out pattern recognition on the image A to detect lateral boundaries of the roadway as boundaries of the roadway surface (in particular, toward the shoulder) and also as lane markings (roadway markings).

In an optional subsequent operation, the profile EV is filtered, for example, smoothed.

Parallel thereto—not necessarily parallel temporally but at least functionally—swarm data SD pertaining to the currently used roadway are retrieved from a database 6. For this purpose, the transportation vehicle 1 comprises a communication interface 8, shown here as a radio interface, by way of example.

A comparison lane VF of the roadway and a comparison profile VV of the comparison lane VF are derived from these swarm data SD. For this purpose, information contained in the swarm data SD relating to lateral boundaries captured by third-party vehicles is evaluated, for example, a multiplicity of identical boundaries (e.g., lane markings) are averaged. Subsequently, the comparison profile VV is also filtered just like the profile EV of the ego lane EF.

Furthermore, a driving line, "drivable path DP", is also obtained from the swarm data SD. In the exemplary embodiment shown, the drivable path DP is already part of the swarm data SD; alternatively the drivable path DP is derived ("computed") from the swarm data SD. In this case, the drivable path DP constitutes the "line of movement" taken by the third-party vehicles in the comparison lane VF.

Parallel thereto, a so-called ego position EP is ascertained for the transportation vehicle 1, for example, on the basis of navigation data ND, which ego position indicates the position of the transportation vehicle 1 in the ego lane EF. The ego position EP, optionally the trend therein over time, is compared with the drivable path DP and in this case a degree of match UM is ascertained. In this case, the degree of match UM indicates, for example, a lateral difference between the ego position EP and the drivable path DP, i.e., how far the transportation vehicle 1 is offset laterally within the ego lane EF in relation to the drivable path DP.

Optionally, the degree of match UM is also filtered.

The profile EV of the ego lane EF, the comparison profile VV, the drivable path DP and also the degree of match UM are supplied to an evaluation block 10.

Moreover, various items of meta information that influence the detection of the ego lane EF and/or of the upcoming profile EV of the ego lane EF are captured. In this case, variable environmental situations such as the position of the sun SUN, a lighting type LIGHT, visibility SIGHT and/or the weather W are ascertained and supplied to the evaluation block. In addition, properties of the surroundings that are practically invariable at least for the present application are also captured in this case, namely a roadway type FT (for example, whether the roadway is formed from asphalt, concrete, or gravel; is one-lane, two-lane, with or without a center marking, with a lateral marking, with a sidewalk and the like) and a marking quality Q of a roadway marking are ascertained and likewise supplied to the evaluation block 10.

Moreover, a "localization confidence LK" is gathered for the swarm data SD and supplied to the evaluation block 10. This localization confidence LK indicates the certainty with which the ego position EP is correctly positioned in relation to the swarm data SD, that is to say in relation to the comparison profile VV and/or to the drivable path DP.

The meta information, the localization confidence LK, the profile EF and the comparison profile VV are subsequently used as a basis for ascertaining an uncertainty factor UF for the ego lane EF, and the profile EF thereof, derived from the image A from the camera 4. In a simple embodiment, the meta information is assessed as to whether it supports an optical detection of the lane boundaries (for example, in the case of a high position of the sun SUN and daylight, no rainfall and no fog) or rather prevents it. If the former is the case and the localization confidence LK is high, the profile EF of the ego lane EF is compared with the comparison profile VV. If the profile EF and the comparison profile are sufficiently similar, that is to say they overlap virtually completely, it is assumed that the profile EF has been reliably ascertained. In this case, a low uncertainty factor UF is chosen and a weighting factor for the profile EF, the comparison profile VV and the drivable path DP are each chosen in such a way that the profile EF is incorporated, alone or predominantly, in a mixed profile MV formed from the three variables.

This mixed profile MV is subsequently used to ascertain (to estimate) a lane curvature SK and to use the latter at a subsequent stage, for example, for ascertaining a lateral acceleration. The lane curvature SK and the lateral acceleration resulting therefrom can then be used in the context of a vehicle guidance function to be able to assess steering maneuvers or the like.

If the meta information suggests that the ascertainment of the ego lane and the profile EV thereof is hindered (for example, a low position of the sun SUN resulting in the light in one's eyes, a wet roadway, poor quality Q of the roadway markings) and there is a comparatively large difference between the profile EF and the comparison profile VV (and optionally also a low degree of match UM), a high uncertainty factor UF is calculated and the weighting factors are specified in such a way that the profile EF derived from the image A is not incorporated in the mixed profile MV or is only incorporated to a particularly small extent.

In an optional embodiment, as an alternative to a fixed set of rules, the evaluation in the evaluation block 10 can also be performed by artificial intelligence, for example, a fully trained neural network, a decision tree or the like.

The subject matter of the disclosure is not limited to the exemplary embodiment described above. Rather, those skilled in the art can derive further exemplary embodiments of the disclosure from the above description.

LIST OF REFERENCE SIGNS

1 Transportation vehicle
2 Control element
4 Camera
6 Database
8 Communication interface
10 Evaluation block
A Image
EF Ego lane
EV Profile
SD Swarm data
VF Comparison lane
VV Comparison profile
DP Drivable path
ND Navigation data
EP Ego position
UM Degree of match
SUN Position of the sun
LIGHT Lighting class
SIGHT Visibility
W Weather
FT Roadway class
Q Marking quality
LK Localization confidence
MV Mixed profile
SK Lane guidance

The invention claimed is:

1. A transportation vehicle comprising:
an image capturing unit;
a communication unit; and
a control unit linked to the image capturing unit and the communication unit for signal transmission purposes, wherein the control unit controls the image capturing unit and communication unit by controlling:
the image capturing unit to generate an optical image of an upcoming roadway lying ahead in a direction of travel of the transportation vehicle, wherein the image is used as a basis for ascertaining an ego lane of the roadway assigned to the transportation vehicle, and the image is used as a basis for ascertaining an upcoming profile of the ego lane,
capturing of at least one item of meta information that influences the detection of the ego lane and/or of the upcoming profile of the ego lane,
retrieving swarm data pertaining to the roadway from a database,
deriving a comparison lane of the roadway and a comparison profile of the comparison lane from the swarm data, using the at least one item of meta information, the upcoming profile and the comparison profile as a basis for ascertaining an uncertainty factor for the image from the image capturing unit, using the uncertainty factor as a basis for determining weighting factors for the upcoming profile and for the comparison profile, providing a mixed profile, which is mixed based on the weighting factors of the ego lane for a vehicle guidance function of the transportation vehicle on the roadway, deriving a driving line for the comparison lane from the swarm data, wherein the driving line corresponds to a line on the lane followed by other transportation vehicles that generated the swarm data used to generate the comparison lane, comparing an ego position of the transportation vehicle on the roadway with the driving line for the comparison lane, determining a degree of agreement for the ego position to the driving line for the comparison lane, determining an uncertainty factor and weighting factors based on the degree of agreement, and determining a mixed profile of the ego lane, wherein contents of the mixed profile of the ego lane are determined to include both portions of the ego lane and portions of the comparison lane based on the determined uncertainty factor, wherein, in response to the uncertainty factor being sufficiently low in comparison to a threshold, the mixed profile contains only the ego lane portions, and wherein, in response to the uncertainty factor being sufficiently high in comparison to a threshold, the mixed profile contains only the comparison lane portions.

2. The transportation vehicle of claim 1, wherein a previous trend in the ego position of the transportation vehicle over time is used for comparing the ego position of the transportation vehicle with the driving line for the comparison lane.

3. The transportation vehicle of claim 1, wherein the driving line, weighted by the weighting factors, is used to generate the mixed profile.

4. The transportation vehicle of claim 1, wherein the at least one item of meta information captured is a current variable environmental situation and/or an approximately invariable property of the surroundings.

5. The transportation vehicle of claim 4, wherein the current environmental situation is the position of the sun, a lighting class, visibility and/or the weather.

6. The transportation vehicle of claim 4, wherein the approximately invariable property of the surroundings is a roadway class, a marking quality of a roadway marking and/or a quality of the roadway surface at the transition to a shoulder.

7. The transportation vehicle of claim 1, wherein the image from the image capturing unit is used as a basis for ascertaining the at least one item of meta information.

8. The transportation vehicle of claim 1, wherein the ego lane, the upcoming profile thereof, the comparison lane, the comparison profile thereof and/or the driving line is filtered before determining the uncertainty factor.

9. The transportation vehicle of claim 1, wherein a localization confidence of the swarm data is taken into account when determining the uncertainty factor.

10. The transportation vehicle of claim 1, wherein the mixed profile of the ego lane is used as a basis for ascertaining a lane curvature of the profile of the ego lane and the lane curvature is used for lateral guidance of the transportation vehicle.

11. The apparatus of claim 1, wherein the comparison of the ego position of the motor vehicle on the roadway with the driving line for the comparison lane is performed with respect to the ego lane.

12. The apparatus of claim 1, wherein the comparison of the ego position of the motor vehicle on the roadway with the driving line for the comparison lane is performed with respect to at least one lateral boundary of the ego lane.

13. A method for operating a transportation vehicle, wherein an image capturing unit is used to generate an optical image of an upcoming roadway lying ahead in the direction of travel of the transportation vehicle, the method comprising:

capturing of at least one item of meta information that influences the detection of the ego lane and/or of the upcoming profile of the ego lane, wherein the image is used as a basis for ascertaining an ego lane of the roadway assigned to the transportation vehicle, the image is used as a basis for ascertaining an upcoming profile of the ego lane, at least one item of meta information that influences the detection of the ego lane and/or of the upcoming profile of the ego lane is captured, swarm data pertaining to the roadway is retrieved from a database, a comparison lane of the roadway and a comparison profile of the comparison lane is derived from the swarm data, the at least one item of meta information, the upcoming profile and the comparison profile is used as a basis for ascertaining an uncertainty factor for the image from the image capturing unit, the uncertainty factor is used as a basis for determining weighting factors for the upcoming profile and for the comparison profile, a mixed profile, which is mixed based on the ego lane for a vehicle guidance function of the transportation vehicle on the roadway, a driving line for the comparison lane from the swarm data is derived, wherein the driving line corresponds to a line on the lane followed by other transportation vehicles that generated the swarm data used to generate the comparison lane, an ego position of the transportation vehicle on the roadway is compared with the driving line for the comparison lane, a degree of agreement for the ego position to the driving line is determined for the comparison lane, an uncertainty factor and weighting factors are determined based on the degree of agreement, and a mixed profile of the ego lane is determined, wherein contents of the mixed profile of the ego lane are determined to include both portions of the ego lane and portions of the comparison lane based on the determined uncertainty factor, wherein, in response to the uncertainty factor being sufficiently low in comparison to a threshold, the mixed profile contains only the ego lane portions, and wherein, in response to the uncertainty factor being sufficiently high in comparison to a threshold, the mixed profile contains only the comparison lane portions.

14. The method of claim 13, wherein a previous trend in the ego position of the transportation vehicle over time is used for comparing the ego position of the transportation vehicle with the driving line for the comparison lane.

15. The method of claim 13, wherein the driving line, weighted by the weighting factors, is used to generate the mixed profile.

16. The method of claim 13, wherein the at least one item of meta information captured is a current variable environmental situation and/or an approximately invariable property of the surroundings.

17. The method of claim 16, wherein the current environmental situation is the position of the sun, a lighting class, visibility, and/or the weather.

18. The method of claim 16, wherein the approximately invariable property of the surroundings is a roadway class, a marking quality of a roadway marking and/or a quality of the roadway surface at the transition to a shoulder.

19. The method of claim 13, wherein the image from the image capturing unit is used as a basis for ascertaining the at least one item of meta information.

20. The method of claim 13, wherein the ego lane, the upcoming profile thereof, the comparison lane, the comparison profile thereof and/or the driving line is filtered before determining the uncertainty factor.

21. The method of claim 13, wherein a localization confidence of the swarm data is taken into account when determining the uncertainty factor.

22. The method of claim 13, wherein the comparison of the ego position of the motor vehicle on the roadway with the driving line for the comparison lane is performed with respect to the ego lane.

23. The method of claim 13, wherein the comparison of the ego position of the motor vehicle on the roadway with the driving line for the comparison lane is performed with respect to at least one lateral boundary of the ego lane.

* * * * *